(12) United States Patent (10) Patent No.: US 9,391,889 B1
Nehme Antoun et al. (45) Date of Patent: Jul. 12, 2016

(54) METHODS AND SYSTEMS FOR USING DNS-DIP TO SELECT CODEC FOR A COMMUNICATION SESSION

(71) Applicant: Sprint Spectrum L.P., Overland Park, KS (US)

(72) Inventors: Nicolas A. Nehme Antoun, Olathe, KS (US); Pierce Gorman, Lee's Summit, MO (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 226 days.

(21) Appl. No.: 13/970,187

(22) Filed: Aug. 19, 2013

(51) Int. Cl.
*H04L 1/00* (2006.01)
*H04L 12/741* (2013.01)

(52) U.S. Cl.
CPC ....................................... *H04L 45/74* (2013.01)

(58) Field of Classification Search
CPC ......... H04L 65/00; H04L 65/01; H04L 65/02; H04L 65/03; H04L 2012/64; H04L 2012/65; H04L 2012/66; H04L 2012/67
USPC .......... 370/351, 352, 355, 356; 709/227, 228, 709/245, 246
See application file for complete search history.

(56) References Cited

U.S. PATENT DOCUMENTS

| | | | |
|---|---|---|---|
| 7,260,384 B2 | 8/2007 | Bales et al. | |
| 7,768,998 B1 | 8/2010 | Everson et al. | |
| 8,060,135 B2 | 11/2011 | Bales et al. | |
| 8,064,951 B2 | 11/2011 | Woodson et al. | |
| 8,169,952 B2 | 5/2012 | Woodson et al. | |
| 8,180,393 B2 | 5/2012 | Phillips et al. | |
| 8,254,989 B2 | 8/2012 | Bales et al. | |
| 8,295,171 B2 | 10/2012 | Bajko et al. | |
| 8,811,393 B2* | 8/2014 | Reddy et al. | 370/389 |
| 2003/0217174 A1* | 11/2003 | Dorenbosch et al. | 709/237 |
| 2006/0026288 A1* | 2/2006 | Acharya et al. | 709/227 |
| 2009/0131024 A1* | 5/2009 | Osborn | 455/414.1 |
| 2009/0177784 A1* | 7/2009 | Olson et al. | 709/228 |
| 2009/0285204 A1* | 11/2009 | Gallant | G06Q 20/102 370/352 |
| 2010/0134590 A1 | 6/2010 | Lindstrom et al. | |
| 2013/0064369 A1* | 3/2013 | Pummill et al. | 380/247 |

OTHER PUBLICATIONS

Cotton, M.; Internet Engineering Task Force (IETF), Request for Comments: 6335—Internet Assigned Numbers Authority (IANA) Procedures for the Management of the Service Name and Transport Protocol Port Number Registry; Aug. 2011, 33 pages.

(Continued)

*Primary Examiner* — Dady Chery

(57) ABSTRACT

Example methods and systems for requesting information from the Internet Domain Name System (DNS) based on a destination and one or more codecs of a source specified within a computer-readable invitation to establish a communication session are described. A source gateway or a user agent device can generate the invitation. A DNS record associated with the destination can specify codecs used by the destination or a gateway the destination uses to carry out communication sessions. A proxy server that received the invitation and the DNS record can select a gateway that uses a codec that matches a codec used and preferred by a gateway. The proxy server can forward the codec to selected gateway, in particular, to an IP address and port associated with the selected gateway, for notifying the destinations of the requested communication session. The invitations can comprise SIP INVITE messages.

20 Claims, 4 Drawing Sheets

(56) References Cited

OTHER PUBLICATIONS

SRV record; downloaded from the World Wide Web at http://en.wikipedia.org/SRV_record on Aug. 2, 2013, 4 pages.
Codec, downloaded from the World Wide Web at http://en.wikipedia.org/Codec on Aug. 6, 2013, 4 pages.
About.com, Wireless / Networking, What is a DNS Server?; downloaded from the World Wide Web at http://compnetworking.about.com/od/dns_domainnamesystem/f/dns_servers.htm?p=1 on Aug. 8, 2013, 1 page.
Mealling, M.; Network Working Group, Request for Comments: 2915; The Naming Authority Pointer (NAPTR) Resource Record; Sep. 2000, 18 pages.
Janak, Jan; SIP Introduction, downloaded from the World Wide Web at http:ftp/iptel.org/pub/ser/0.8.14/doc/html/sip_introduction.html on Aug. 2, 2013, 19 pages.
Peterson, J.; Network Working Group, Request for Comments: 3764; enumservice registration for Session Initiation Protocol (SIP) Addresses-of-Record; Apr. 2004; 8 pages.
List of CODECS; downloaded from the World Wide Web at https://en.wikipedia.org/wiki/List_of_codecs on Aug. 2, 2013, 11 pages.
Mealling, M.; Network Working Group, Request for Comments: 3403; Dynamic Delegation Discovery System (DDDS) Part Three: The Domain Name System (DNS) Database; Oct. 2002; 14 pages.
Lightweight Directory Access Protocol; downloaded from the World Wide Web at http://en.wikipedia.org/wiki/Lightweight_Directory_Access_Protocol on Jul. 25, 2013; 14 pages.
NAPTR Record; downloaded from the World Wide Web at http://en.wikipedia.org/wiki/NAPTR_record on Jul. 25, 2013; 3 pages.
Baron, Dennis; Massachusetts Institute of Technology; SIP Fundimentals IAP 2008 VoIP Series, Jan. 15, 2008, 29 pages.
Rosenberg, J.; et al.; Network Working Group, Request for Comments: 3261; SIP: Session Initiation Protocol, Jun. 2002; 269 pages.
Cisco Systems, Inc.; SIP Configuration Guide, Cisco IOS, Release 12.4T; Sep. 28, 2012; 766 pages.
Brownsworth, Anders; Technology and Disruption, Tutorial: SIP using NAPTR and SRV DNS Records; Sep. 28, 2008; 6 pages.
Toncar, Vladimir; VoIP Protocols: H.323 Call Flow, downloaded from the World Wide Web at http://toncar.cz/Tutorials/VoIP/VoIP_Protocols_H323_Call_Flow.html on Aug. 2, 2013; 5 pages.
Toncar, Vladimir; VoIP Protocols: Introducing H.323, downloaded from the World Wide Web at http://toncar.cz/Tutorials/VoIP/VoIP_Protocols_Introducing_H323.html on Aug. 2, 2013; 3 pages.
Telco Bridges; Tdev TMS1600 Data Sheet; Jul. 16, 2009; 2 pages.
Telco Bridges; Tmedia TMG3200-RJ Series VoIP Gateway; Jan. 2011; 2 pages.
Telco Bridges; TmediaTMG800 Data Sheet VoIP / Media gateway data sheet; Dec. 6, 2011; 2 pages.
Teleprime Advanced Communications Division; Application note Primary Rate ISDN Signaling Conversion using QuadroM Gateways; Apr. 23, 2013, 1 page.
Donohue, Denise; et al.; Session Initiation Protocol—Description of SIP; Oct. 16, 2006; 16 pages.
AG_Projects; ENUM, downloaded from the World Wide Web at http://www.ag-projects.com/projects-products-96/61-enum on Jul. 25, 2013; 2 pages.
Grigorik, Iiya; High Performance Browser Networking; Chapter 7. Mobile Networks, Part II. Performance of Wireless Networks; downloaded from the World Wide Web at http://chimera.labs.oreilly.com/books/1230000000545/ch07.html on Aug. 2, 2013; 33 pages.
Oracle; Overview of the SIP Protocol and SIP Container; downloaded from the World Wide Web at http://docs.oracle.com/cd/E13205_01/wcp/wIss201/sipserverdoc/system/architecture.html on Aug. 2, 2013; 4 pages.
Sinnreich, Henry; et al.; SIP Beyond VoIP; Table of contents, 2-4, 17-21, 34-35, 39-40, and 173-187 (37 pages); Jul. 2005.
Techtarget; SearchSOA.com; UDP (User Data Protocol); downloaded from the World Wide Web at http://searchsoa.techtarget.com/definition/UDP?vgnextfmt=print on Aug. 2, 2013; 1 page.
3CX; What different types of CODECS are there? downloaded from the World Wide Web at http://www.3cx.com/pbx/codecs/ on Jul. 2, 5, 2013; 1 page.

* cited by examiner

US 9,391,889 B1

METHODS AND SYSTEMS FOR USING DNS-DIP TO SELECT CODEC FOR A COMMUNICATION SESSION

BACKGROUND

User agent devices can function as end-points of a communication session. A communication session can include a voice communication session, such a voice call, or a data communication session, such as a video call. A user agent device can comprise a telephone within the public switched telephone network (PSTN), a cellular phone within a cellular radio access network (RAN), a phone within a packet-switched network, such as a session initiation protocol (SIP) phone, or some other type of phone or device.

From a perspective of a user agent device that initiates a communication session, that user agent device can be referred to as a near-end device, whereas a user agent device at the other end of the communication session can be referred to as a far-end device. From a perspective of the called user agent device, that user agent device can be referred to as the near-end device, whereas the user agent device that initiated the communication session can be referred to as the far-end device.

User agent devices can carry out the communication sessions using a communications network that includes or accesses a domain name system (DNS) of the Internet. The communications network can be referred to as a packet-switched network. A packet-switched network can carry data, such as voice data, using packets of data. The packet-switched network is not necessarily dedicated to a single communication session. Portions of a communication session, such as portions of the communication session transmitted to and from a user agent device can be carried out using a circuit-switched network. A portion of the circuit-switched network can be dedicated to the user agent devices carrying out a communication signal.

Unless otherwise indicated herein, the elements described in this section are not prior art to the claims and are not admitted to be prior art by inclusion in this section.

OVERVIEW

This application describes several example embodiments, at least some of which pertain to dipping into the DNS to select a codec for use during a communication session. Dipping into the DNS can include requesting codec information or Internet Protocol (IP) address and port information from a DNS server registered with the DNS. The DNS server that receives a request for information can itself request the requested information from another registered DNS server of the DNS. A proxy server, acting on behalf of a user agent device or a gateway device between two or more networks (such as Internet and the PSTN), can request the information from the DNS server, and responsively receive the requested information from the DNS server.

In one respect, an example embodiment can take the form of a method comprising: (i) receiving, by a proxy server, a computer-readable invitation specifying a destination and one or more codecs supported by a source of the computer-readable invitation, (ii) requesting, by the proxy server and from a domain name system (DNS) server, a record associated with the destination specified by the computer-readable invitation, (iii) receiving, by the proxy server in response to requesting the record, a first record associated with the destination specified by the computer-readable invitation, and (iv) routing, by the proxy server, the computer-readable invitation towards a destination specified by the first record.

In another respect, an example embodiment can take the form of a system comprising: (i) a network interface configured to receive a computer-readable invitation specifying a destination and one or more codecs supported by a source of the computer-readable invitation, (ii) a processor, and (iii) a data storage device storing computer-readable program instructions, wherein the program instructions are executable by the processor to cause the network interface to request, from a domain name system (DNS) server, a record associated with the destination specified by the computer-readable invitation, wherein the program instructions are executable by the processor to receive a first record associated with the destination specified by the computer-readable invitation, and wherein the program instructions are executable by the processor to cause the network interface to route the computer-readable invitation towards a destination specified by the first record.

In yet another respect, an example embodiment can take the form of a computer-readable data storage device comprising program instructions executable by a processor to cause performance of the following operations: (i) receiving a computer-readable invitation specifying a destination and one or more codecs supported by a source of the computer-readable invitation, (ii) requesting, from a domain name system (DNS) server, a record associated with the destination specified by the computer-readable invitation, (iii) receiving, in response to requesting the record, a first record associated with the destination specified by the computer-readable invitation, and (iv) routing the computer-readable invitation towards a destination specified by the first record.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

As mentioned above, this description describes several example embodiments, at least some of which pertain to dipping into (or requesting from) the DNS to select a codec for use during a communication session. A proxy server can request records associated with a destination for a requested communication session. The requested records can specify, among other things, gateways associated with the destination, codecs used by the associated gateways, and preferences of using the codecs.

Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions or operations) can be used instead. Furthermore, various functions or operations described as being performed by one or more elements can be carried out by a processor executing computer-readable program instructions or by any combination of hardware, firmware, or software.

II. Example System Architecture

Figure 1:
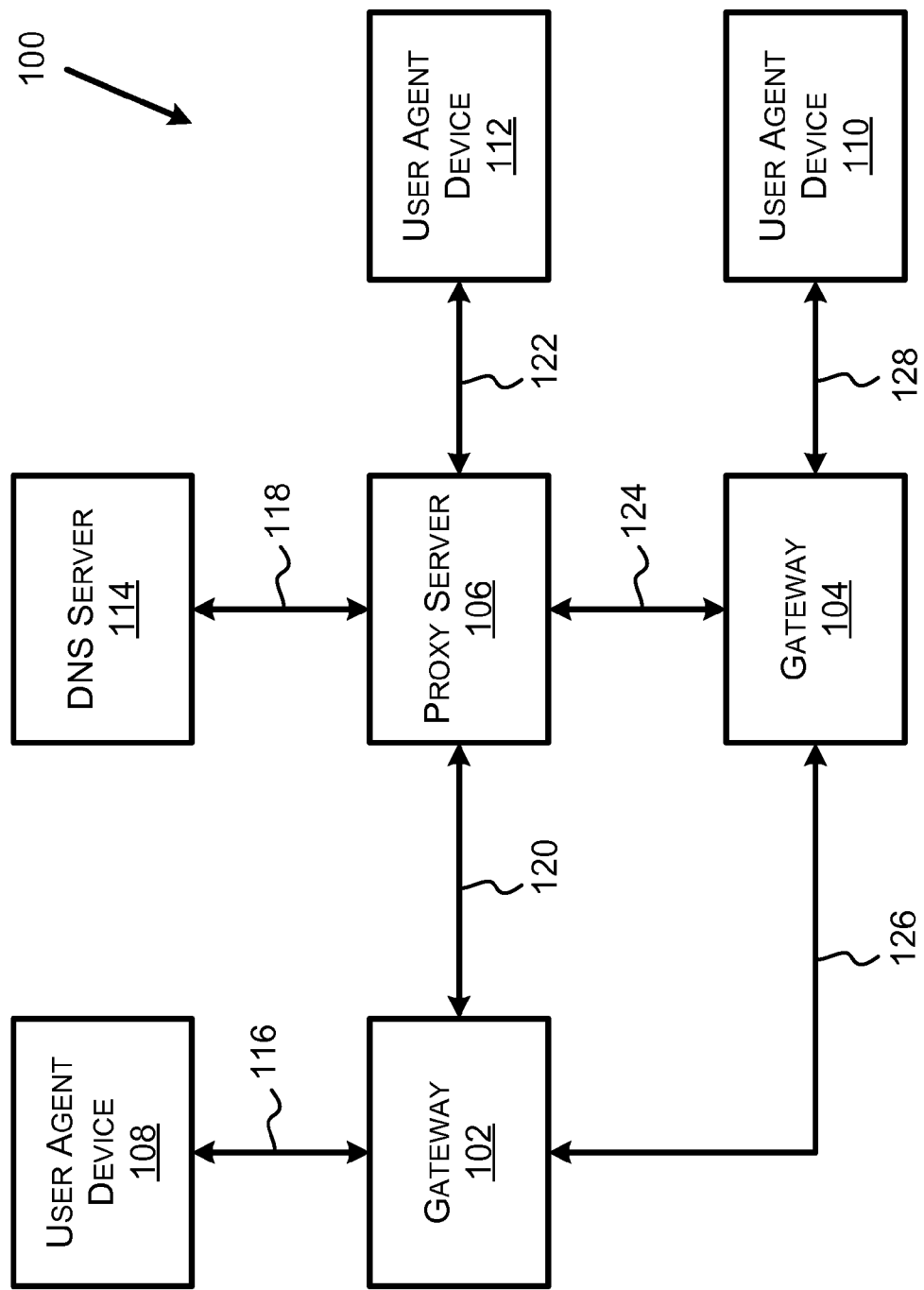
FIG. 1 is a block diagram that shows components of a system in accordance with one or more example embodiments described herein.

FIG. 1 is a block diagram that shows components of a system 100 in accordance with one or more of the example embodiments described herein. System 100 includes gateways 102 and 104, a proxy server 106, user agent devices 108, 110, and 112, a domain name system (DNS) server 114, and communication links 116, 118, 120, 122, 124, 126, and 128. For purposes of this description, those communication links are referred to as communication links 116-128, or more simply, links 116-128. Any one or more of links 116-128 can individually be referred to as a link. One or more of links 116-128 can comprise a wireless communication link, a wired communication link, or both. One or more of links 116-128 can comprise or be a portion of the Internet or some other communication network.

Each component of system 100 connected to a communication link can include one or more communication link interfaces, or more simply "interfaces," to each connected communication link. For purposes of this description, an interface to a communication link can comprise one or more transmitters to transmit various communications onto and across the connected communication link, and one or more receivers to receive various communications transmitted across the connected communication link. Connection of an interface to a communication link can occur, for example, using a wired connection, such as a connection to a CAT-5 cable, a coaxial cable, or a fiber optic cable, or using a wireless connection, such as an air interface of a cellular network or a WiFi network.

Proxy server 106 can comprise a server device that receives, processes, and transmits messages. As an example, the proxy server messages can comprise record-requests for requesting records from DNS server 114 and responses DNS server 114 provides in response to the record-requests. As another example, the proxy server messages can be for establishing a communication session between two user agent devices. One user agent device, such as user agent device 108 can initiate establishing a communication session with a destination agent user device, such as user agent device 110 or 112, by providing signals to gateway 102. The communication session can, for example, comprise a voice call.

Proxy server 106 can comprise a SIP server at which the proxy server messages for establishing the communication session between the user agent devices comprises SIP messaging. A SIP server can be configured to operate in accordance with the Internet Society's Request for Comments: 3261, entitled "SIP: Session Initiation Protocol."

User agent devices 108, 110, and 112 can comprise components configure for a user to use to participate in a communication session. As an example, those components can include a microphone and associated electronic circuitry for receiving and processing sounds produced by the user, a loud speaker for reproducing sounds produced by a user at a far end of the communication session, a device for capturing media, such as an image or video signal, to be provided to the far-end user agent device, or a display for visually presenting media produced at or received from the far-end user agent device. User agent devices 108, 110, and 112 can include an input device, such as a keypad or keyboard, for dialing a destination identifier, such as a telephone number of the far-end user agent device or an e-mail address. User agent devices 108, 110, and 112 can include a device for answering a communication session.

User agent device 112 and proxy server 106 can be connected using link 122. Link 122 can comprise a packet-switched link of the Internet. User agent device 112 can, for example, comprise a SIP telephone, a cellular phone having a computer-readable VoIP client executable by a processor of the cellular phone, or a softphone application operating on a desktop or laptop personal computer.

User agent device 108 can connect to proxy server 106 using links 116 and 120 and gateway 102. Similarly, user agent device 110 can connect to proxy server 106 using links 124 and 128 and gateway 104. User agent devices 108 and 110 can comprise a telephone, such as a landline telephone or a cellular phone. Links 116 and 128 can, for example, comprise a portion of a public switched telephone network (PSTN), a digital subscriber line (DSL), or a portion of a radio access network (RAN). The portion of the RAN can include a wireless base station, a base station controller, a mobile switching center, a backhaul network, or some other elements.

A RAN can include or connect to a core network operated by a wireless service provider. The core network can include or connect to a gateway, such as gateway 102 or 104, or proxy server 106. The core network can include other elements such as, but not limited to, a virtual private network terminator, a media gateway, and a packet data serving node.

At least a portions of the communications carried out by a wireless user agent device and the RAN can conform to or be arranged according to one or more wireless communication protocols, such as code division multiple access (CDMA), where a RAN that operates according to industry specifications (IS) such as IS 95 and IS 2000 are often referred to as a 1×RTT (or "1×") network, and where 1×RTT stands for Single Carrier Radio Transmission Technology. A RAN can operate in accordance with a particular type of CDMA protocol known as Evolution Data Optimized (EV DO). That RAN is generally configured to operate according to one or more versions of IS 856, and is designed to provide high-rate packet-data service to user agent devices using a technique on the forward link known as time-division multiplexing (TDM) and using what is essentially 1× technology on the reverse link. More generally, a user agent device and RAN can be arranged to operate according to any of numerous other protocols, some examples of which are Long Term Evolution (LTE), Universal Mobile Telecommunications System (UMTS), WiMAX (IEEE 802.16), time division multiple access (TDMA), Global System for Mobile Communications (GSM), Wi Fi (IEEE 802.11), and the like.

Gateway 102 can comprise interface(s) to links 116, 120, and 126. Gateway 102 can comprise a processor and a data storage device comprising computer-readable program instructions executable by that processor to generate and cause an interface to transmit communications to links 116, 120, and 126, and to receive and process the communications an interface receives from links 116, 120, and 126. Gateway 102 can comprise or be arranged as a gateway between two or more different types of links. As an example, those different types of links can include link 116 configured like a circuit-switched local loop of the PSTN, and link 120 a packet-switched link of the Internet.

As another example, gateway 102 can comprise a SIP-PSTN gateway configured to decode SIP communications received by gateway 102 and transmit a decoded signal to user agent device 108 using a local loop of the PSTN, and configured to encode a signal gateway 102 receives from user agent device 108 into a SIP message and transmit the SIP message using a link such as link 120 or 126.

Gateway 104 can comprise interface(s) to links 124, 126, and 128. Gateway 104 can comprise a processor and a data storage device comprising computer-readable program instructions executable by that processor to generate and cause an interface to transmit communications to links 124, 126, and 128, and to receive and process the communications an interface receives from links 124, 126, and 128. Similar to gateway 102, gateway 104 can comprise or be arranged as a gateway between two or more different types of links. A gateway can receive communications on a first of the different links, convert the communications for transmitting on a second of the different links, and transmit the converted communications on the second of the different links. As another example, gateway 104 can comprise a SIP-PSTN gateway.

Gateways 102 and 104 can comprise one or more codecs. A codec can be referred to as a coder-decoder or a compressor-decompressor, as the codec can perform coding and decoding functions or compression and decompression functions. A codec can comprise electronic circuitry or computer-readable program logic to perform the coding and decoding functions or compression and decompression functions. The program logic of the codec can be arranged as or include computer-readable program instructions. The processors within gateways 102 and 104 can execute the codec program instructions. A codec of gateway 102 can encode a data stream, such as a data stream received from user agent device 108, for transmission over link 126. A codec of gateway 102 can receive a data stream transmitted over link 126, decode the received data stream, and transmit the decoded data stream over link 116 to user agent device 108.

The codec(s) within gateways 102 and 104 can comprise any of a variety of codecs. As an example, the codec can comprise a speech or voice over internet protocol (VoIP) codec. A speech or VoIP codec can comprise an adaptive multi-rate (AMR) codec, an enhanced variable rate codec (EVRC), an Internet low bit rated codec (iLBC), a G.723 codec, a G.729 codec, a G.711 A Law codec, a G.711 μ-Law codec, or some other type of codec.

DNS server 114 comprises a processor and computer-readable data storage device storing computer-readable program instructions and a database of domain names and IP addresses. DNS server 114 can receive a record-request transmitted using link 118, and execute the program instructions to retrieve a DNS record for a destination specified in the record-request from its own database or from another DNS server having another database of domain names and IP addresses. DNS server 114 can transmit a name authority pointer (NAPTR) record over link 118 to proxy server 106.

The communications transmitted by gateway 102 can include communications for establishing a communication session between two user agent devices, such as a voice communication session between user agent device 108 and user agent device 110 or 112, and communications for carrying out the communication session, such as voice communications carried over link 126 between gateway 102 and gateway 104. The communications to establish the communication session can include an invitation specifying a destination and one or more codecs supported by gateway 102.

Proxy server 106 can transmit record-requests to DNS server 114 over link 118 and receive responses from DNS server 114 over link 118 in response to the record-requests proxy server 106 transmits to DNS server 114. A record-request to DNS server 114, for a communication session initiated by user agent device 108 and between user agent devices 108 and 110, can include a request for codec information regarding gateway 104 or user agent device 110. The record-request to DNS server 114 can be configured as a name authority pointer (NAPTR) record-request to request records from DNS server 114 in accordance with at least a portion of the Internet Society's Request for Comments: 2915, entitled: "The Naming Authority Pointer (NAPTR) DNS Resource Record."

Proxy server 106 can transmit requests to a second proxy server (not shown) for subsequent transmission to a next hop towards a destination of the request. A third proxy server (not shown) between gateway 102 and proxy server 106 can transmit a request from gateway 102 to proxy server 106. System 100 can include other proxy servers (not shown) for forwarding communications, such as requests to establish a communication session or DNS record-requests to a next hop within the communication network.

Figure 2:
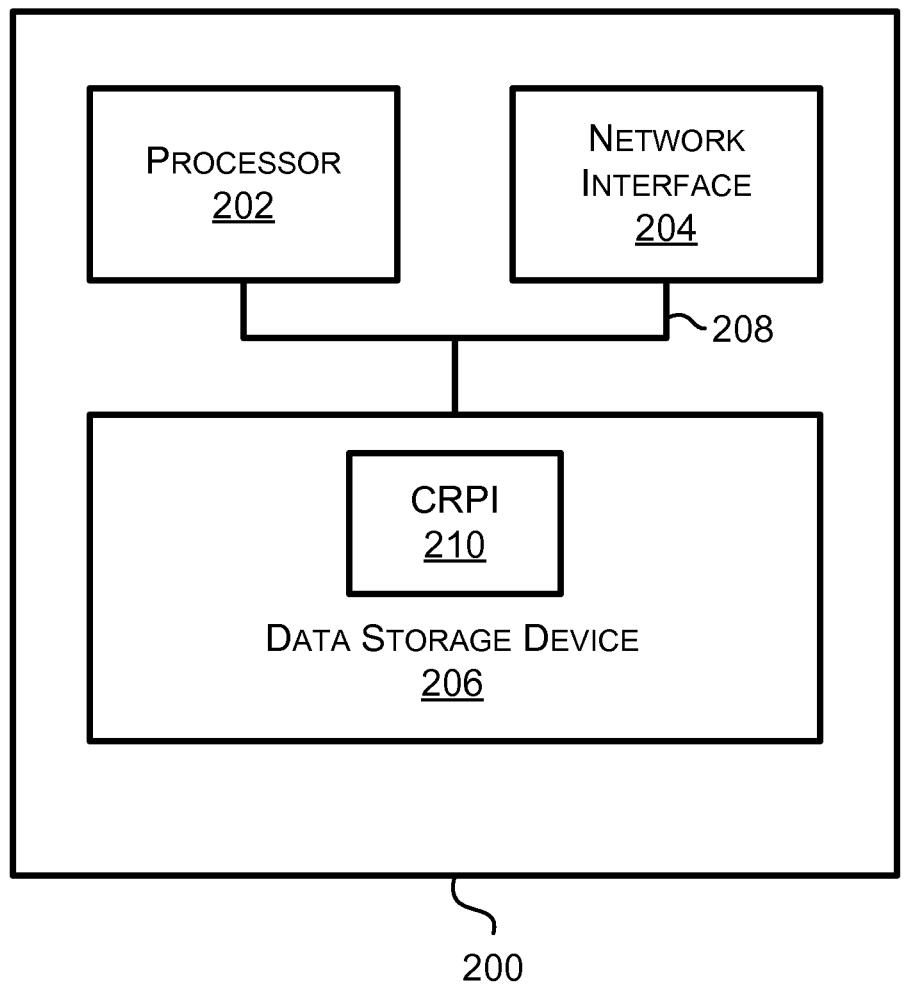
FIG. 2 is a block diagram of a system in accordance with one or more example embodiments described herein.

Next, FIG. 2 is a block diagram of a system 200 in accordance with one or more example embodiments described herein. Proxy server 106 shown in FIG. 1 and FIG. 3 can be configured like system 200. As shown in FIG. 2, system 200 includes a processor 202, a network interface 204, and a data storage device 206, all of which can be linked together via a system bus, network, or other connection mechanism 208.

Processor 202, as well as each of the other processors discussed herein or used within an example embodiment, can comprise one or more general purpose processors (for example, INTEL single core microprocessors or INTEL multicore microprocessors) or one or more special purpose processors (for example, application specific integrated circuits (ASICs) or digital signal processors (DSPs)). Processor 202 can execute computer-readable program instructions (CRPI), such as CRPI 210 stored in data storage device 206.

Network interface 204 can comprise an interface (for example, one or more interfaces) to at least one network or link. The at least one network can comprise the Internet or a portion thereof. Network interface 204 can comprise a transmitter configured to transmit and a receiver configured to receive communications such as signaling and bearer communications to or from another element of system 100, such as gateways 102 or 104 and DNS server 114. The transmitter and receiver can be separate or a combined transmitter and receiver in the form of a transceiver. Network interface 204 can be configured to receive a computer-readable invitation specifying a destination and one or more codecs supported by a source of the invitation.

Data storage device 206, as well as each of the other data storage devices discussed herein or used within an example embodiment, can comprise a non-transitory computer-readable storage medium readable by a processor, such as processor 202. The computer-readable storage medium can comprise volatile and/or non-volatile storage components, such as optical, magnetic, organic or other memory or disc storage, which can be integrated in whole or in part with a processor. At least a portion of data storage device 206 can be a non-transitory machine readable medium separate from a processor.

CRPI 210 can comprise a variety of program instructions executable by processor 202. Executing program instructions of CRPI 210 can include executing some, but not all, of the program instructions of CRPI 210.

CRPI 210 can comprise program instructions that cause processor 202 to receive messages received by network interface 204. Those or other program instructions can be used to parse the received messages to determine content of the received messages. As an example, the content of a received message can include a source identifier of a source that generated the received message, a destination identifier of a destination for the received message or of a destination to which proxy server 106 is being requested to transmit, to or towards, a message. Other messages received by network interface 204 can have other content.

CRPI 210 can comprise program instructions that cause processor 202 to generate messages to be transmitted by network interface 204 or to provide data to network interface 204 for generating messages to be transmitted by network interface 204. As an example, the messages generated or transmitted by executing CRPI 210 can include a record-request, such as record-request 306 shown in FIG. 3, a server record query, such as server record query 310 shown in FIG. 3, a computer-readable invitation (CRI), such as CRI 314 shown in FIG. 3, or some other type of message.

CRPI 210 can comprise program instructions to compare (i) data indicating codecs supported by a first gateway, such as gateway 102, and a ranking or order of the codecs supported by the first gateway, to (ii) data indicating codecs supported by a second gateway, such as gateway 104, and a ranking or order of the codecs supported by the second gateway. The program instructions to compare data regarding the supported codecs or other program instructions can be executed to select a codec for carrying out a communication session using the first and second gateways.

In one respect, selecting the codec can be conditioned on selecting (i) a highest ranked or most preferred codec of the first gateway that initiates a communication session for a first user agent device to a second user agent device that uses the second gateway, and (ii) a codec supported by the second gateway. In another respect, selecting the codec can be conditioned on selecting (i) a highest ranked or most preferred codec of the second gateway that the second user agent device can use for a communication session the first user agent device initiates, and (ii) a codec supported by the first gateway. In yet another respect, selecting the codec can be conditioned on selecting a codec having a combined highest ranking or preference based on individual codec rankings or preferences of the first gateway and second gateway.

CRPI 210 can comprise program instructions to select the second gateway from among two or more gateways a user agent device, such as user agent device 110, can use for transmissions to a codec used by the first gateway, such as gateway 102. Other examples of program instructions within CRPI 210 are also possible.

CRPI 210 can comprise program instructions that cause data storage device 206 to store data within a record-request response (refer to message 308 in FIG. 3) or server record query response (refer to message 312 in FIG. 3) for use in future invitations for communications requests between user agent devices 108 and 110. CRPI 210 can comprise program instructions to delete or overwrite that stored data after a predetermined time period, such as 24 hours or some other time period. Prior to deleting the stored data, proxy server 106 can refer to the stored data in the event user agent device 108 initiates another communication session with user agent device 110.

III. Example Message Flow

Figure 3:
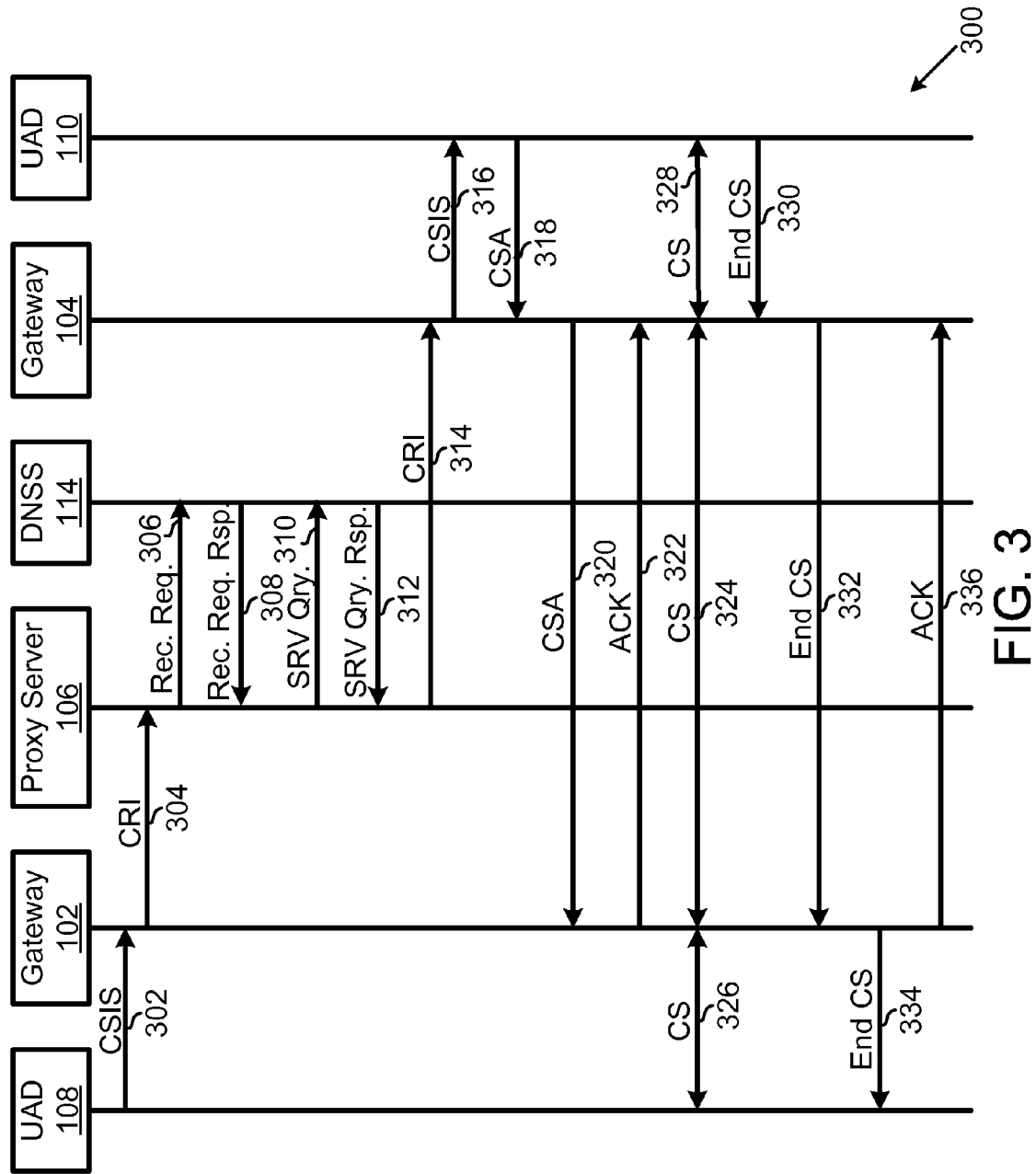
FIG. 3 is an example message and communications flow for establishing, performing, and ending a communication session between two user agent devices in accordance with one or more example embodiments described herein.

FIG. 3 is an example message and communications flow (or more simply, "flow") 300 for establishing, performing, and ending a communication session between two user agent devices. The various messages or communication flows within FIG. 3 are identified with positive integers 302 through 336, inclusive. The following components of system 100, shown in FIG. 1, are shown in FIG. 3: user agent devices 108 and 110, gateways 102 and 104, proxy server 106, and DNS server 114. User agent device 108 initiates the communication session and can be referred to as the near-end device. The near-end device initiates the communication session to a far-end device, user agent device 110 for flow 300.

For purposes of describing FIG. 3, user agent device 110 is associated with one or more identifiers, such as a telephone number or an E.164 number to URI mapping (ENUM) number 9135554444, and a uniform resource indicator (URI) jacob@1234.example.com or jacob@example.com. For communication sessions that user agent device 110 initiates, the associated identifiers can be referred to as source identifiers. For communication sessions initiated to user agent device 110 by another device, the associated identifiers can be referred to as destination identifiers. User agent devices 108 and 112 can be associated with identifiers in a similar manner. A user agent device can dial a country code, such as 1, or some other digits prior to a telephone number. For instance, 19135554444 may be dialed by user agent device 108 to set up a communication session with user agent device 110.

In FIG. 3, the horizontal lines having one arrow head between two vertical component lines represent a one direction messages or communication flow to the component to which the arrow head is pointing. The horizontal lines having two arrow heads between two vertical component lines represent messages or communication flows that occur to and from both devices to which the arrow heads are pointing.

Flow 300 shows communication session initiation signal (s) (CSIS) being sent from user agent device 108 to gateway 102. As an example, CSIS message 302 can comprise signals or tones representing phone number digits associated with user agent device 110 and entered by user agent device 108. As yet another example, CSIS 302 can comprise an Admission Request (ARQ), in accordance with International Telecommunication Union's H.323 protocol, comprising the phone number digits associated with user agent device 110 and entered by user agent device 108. As yet another example, CSIS 302 can comprise a SIP INVITE message comprising the phone number digits or URI associated with user agent device 110. Other examples of CSIS 302 are also possible.

Next, flow 300 shows a computer-readable invitation (CRI) 304 being sent from gateway 102 to proxy server 106. As an example, CRI 304 can comprise a SIP or an H.323 protocol message including the identifier associated with user agent device 110 and data identifying one or more codecs supported by gateway 102. The SIP message can comprise a SIP INVITE message. If two or more codecs are identified by the data within CRI 304, CRI 304 can include data identifying a ranking or order of the two or more codecs supported by gateway 102. As an example, a ranking or order of codes supported by gateway 102 can be as follows: (1) an adaptive multi-rate wideband (amr-wb) codec, (2) an adaptive multi-rate wideband (amr-wb) codec, and (3) an enhanced variable rate code (evrc). Other examples of codes supported by gateway 102 are also possible.

In an alternative arrangement, user agent device 108 can send CRI 304 directly to proxy server 106 without using gateway 102. In this alternative arrangement, the codec(s) identified in CRI 304 indicate codecs supported by user agent device 108. In accordance with this example embodiment, user agent device 108 can comprise a SIP phone.

Next, flow 300 shows a record-request 306 being sent from proxy server 106 to DNS server 114 and the data identifying the codecs supported by gateway 102 and the ranking of those codecs. The record-request 306 can comprise the identifier associated with user agent device 110. If the identifier of user agent device is a telephone number, the record-request can include the telephone number in reverse order plus the "e164.arpa" extension added to the end of reverse-digit telephone number, such as "4.4.4.4.5.5.5.3.1.9.1.e164.arpa." The record-request 306 can comprise a NAPTR record query for the identifier associated with user agent device 110.

Next, flow 300 shows a record-request response 308 being sent from DNS server 114 to proxy server 106. Record-request response 308 can comprise a NAPTR record. The NAPTR record can, for example, include the following ARPA identifier and the data within Table 1.
4.4.4.4.5.5.5.3.1.9.1.e164.arpa order number to highest order number. Alternatively, the order of codecs can be specified from highest order number to lowest order number.

Next, flow 300 shows a server record query (SRV Qry.) 310 being transmitted from proxy server 106 to DNS server 114. Proxy server 106 can select a codec supported by user agent device 110 that matches a codec specified by CRI 304. In accordance with at least some example embodiments, the selected codec matches a highest ranked codec specified by CRI 304. If the highest ranked codec specified by CRI 304 does not match a codec supported by gateway 104 or user agent device 110, proxy server 106 can select a next highest ranking codec specified by CRI 304 that matches a codec supported by gateway 104 or user agent device 110.

Next, flow 300 shows a server record query response (SRV Qry. Rsp) 312 being transmitted from DNS server 114 to proxy server 106. Server record query response 312 can include the data indicating one or more IP addresses and one or more ports for gateway 104, a gateway user agent device 110 communicates with for use of an amr-wb codec. Proxy server 106 can use data within the server record query response 312 to determine where to forward the computer-readable invitation (for example, CRI 304). Alternatively, server record query response 312 can include data indicating one or more IP addresses and one or more ports for a codec within user agent device 110.

Next, flow 300 shows a computer-readable invitation (CRI) 314 being sent from proxy server to gateway 104. CRI 314 can be configured like CRI 304 and can include additional information such as data indicating the codec selected by proxy server 106 or the IP address and port associated with the selected codec.

TABLE 1

| 4.4.4.4.5.5.5.3.1.9.1.e164.arpa | | | | | | | |
|---|---|---|---|---|---|---|---|
| TTL | C | T | O | Pref | F | S | Regexp |
| 7200 | IN | 35 | 50 | 50 | "P" | "E2U + codec" | "! !sip:UA2@evrc.sprint.com!" |
| 7200 | IN | 35 | 30 | 50 | "P" | "E2U + codec" | "! !sip:UA2@evrc-nw.sprint.com!" |
| 7200 | IN | 35 | 10 | 50 | "P" | "E2U + codec" | "! !sip:UA2@amr-wb.sprint.com!" |

The characters in the first row of Table 1 represent the following terms: TTL (time to live), C (class), T (type), O (order), Pref (preference), F (flag), S (services), and Regexp (regular expression). The NAPTR record can include a domain such as example.com for the domain of jacob@example.com URI associated with user agent device 110.

The service field indicates a service type E2U+codec that identifies that the Regexp field comprises codec data. The E2U+codec service type could be identified by other characters. The Regexp data comprises data indicating codecs supported by user agent device 110 or supported by a gateway to which user agent device 110 communicates with to carry out communication sessions. The three codecs include an evrc, an evrc-nw codec, and an amr-wb codec. The preference values for each of the three codecs supported by user agent device 110 are 50, thus no difference in preference is specified by record-request response 308. Alternatively, the preference field data could indicate a preference for using one codec over the other codec(s). Although no preference is specified for the example data, record-request response 308 does indicate an order for the three codecs, the lowest being 10, the highest being 50. An order of codecs can be specified from lowest Next, flow 300 shows communication session invitation signals (CSIS) 316 being sent from gateway 104 to user agent device 110. CSIS 316 can comprise signals that cause user agent device 110 to ring or otherwise signal an incoming communication session is available for connection to user agent device 110. For embodiments in which user agent device 110 is configured like a SIP phone, CSIS can comprise a SIP INVITE.

Next, flow 300 shows a communication session answer (CSA) signal 318 being sent from user agent device 110 to gateway 104. CSA signal 318 can be transmitted in response to user agent device 100 answering while ringing or otherwise accepting the communication session. In accordance with example embodiments in which user agent device 110 is a SIP phone, CSA 318 can comprise a SIP OK message.

Next, flow 300 shows CSA signals 320 being sent from gateway 104 to gateway 102. CSA 320 can be sent in response to gateway 104 receiving CSA 318. CSA 320 can comprise a SIP OK message or other message to indicate user agent device 110 has answered or otherwise accepted the communication session.

Next, flow 300 shows an acknowledgment (ACK) message 322 being sent from gateway 102 to gateway 104. ACK message 322 can be sent to acknowledge acceptance of the communication session requested by CSIS 302, CRI 304, CRI 314, or CSIS 316.

Next, flow 300 shows communications session (CS) signals 324 that gateways 102 and 104 send to one another. The selected codec in gateway 102 can encode or compress voice or data signals from user agent device 108 for transmission to gateway 104 as CS signals 324. Similarly, the selected codec in gateway 102 can encode or compress voice or data signals from user agent device 110 for transmission to gateway 102 as CS signals 324. Gateway 102 can decode or decompress CS signals 324 transmitted by gateway 104 and received by gateway 102. Gateway 104 can decode or decompress CS signals 324 transmitted by gateway 102 and received by gateway 104. CS signals 324 can be transported using a Real Time Transport Protocol (RTP) or using another protocol.

Next, flow 300 shows communications session (CS) signals 326 gateway 102 and user agent devices 108 send to one another. CS signals 326 can include the decoded or decompressed signals gateway 102 produces from CS signals 324. CS signals 326 can include voice or data signals entered by a user using user agent device 108.

Next, flow 300 shows communications session (CS) signals 328 gateway 104 and user agent devices 110 send to one another. CS signals 328 can include the decoded or decompressed signals gateway 104 produces from CS signals 324. CS signals 328 can include voice or data signals entered by a user using user agent device 110.

Next, flow 300 shows an end communication session (End CS) signal 330 being sent from user agent device 110 to gateway 104. The End CS signal 330 can indicate user agent device 110 has been hung up by a user or an end call button has been pressed. In accordance with example embodiments in which user agent device is a phone within the PSTN, End CS signal 330 can comprise a disconnect tone. In accordance with example embodiments in which user agent device is a SIP phone connected to a packet-switched network, End CS signal 330 can comprise a SIP BYE message. Other examples of End CS signal 330 are also possible.

Next, flow 300 shows an end communication session (End CS) signal 332 being sent from gateway 104 to gateway 102. End CS signal 332 can comprise a SIP BYE message or some other type of message to notify gateway 102 that user agent device 110 has ended the communication session. Gateway 104 can generate End CS signal in response to receiving End CS signal 330.

Next, flow 300 shows an end communication session (End CS) signal 334 being sent from gateway 102 to user agent device 108. Gateway 102 can generate and transmit End CS signal 334 in response to receiving End CS signal 332. End CS signal 334 can include a disconnect tone sent to user agent device 108 arranged like a phone connected to the PSTN. End CS signal can comprise a SIP BYE message for embodiments in which user agent device 108 is a packet-switched telephone, such as a SIP phone.

Next, flow 300 shows an acknowledgment (ACK) message 336 being sent from gateway 102 to gateway 104. Gateway 102 can generate and transmit ACK message 336 in response to receiving End CS signal 332. Gateway 104 can generate and transmit an ACK message (not shown) to user agent device 110 in response to receiving ACK message 336. Gateway 104 may, for example, generate and transmit the ACK message for embodiments in which user agent device 110 is a packet-switched telephone, such as a SIP phone.

In flow 300, user agent device 110 ended the communication session. In accordance with one or more example embodiments, user agent device 108 can end the communication session.

In flow 300, user agent device 110 answers or otherwise accepts the communication session requested using CRI 314 and CSIS 316. In accordance with one or more other example embodiments, messages or communication flows 302 through 314 can be carried out prior to gateway 104 determining user agent device 110 is busy or does not answer or otherwise accept the communication session. Upon making that determination, gateway 104 can send signals to gateway 102 indicating user agent device 110 is busy or the communication session request is not accepted. Gateway 102 can send user agent device 108 signals indicating user agent device 110 is busy or the communication session request is not accepted.

IV. Example Operation

Figure 4:
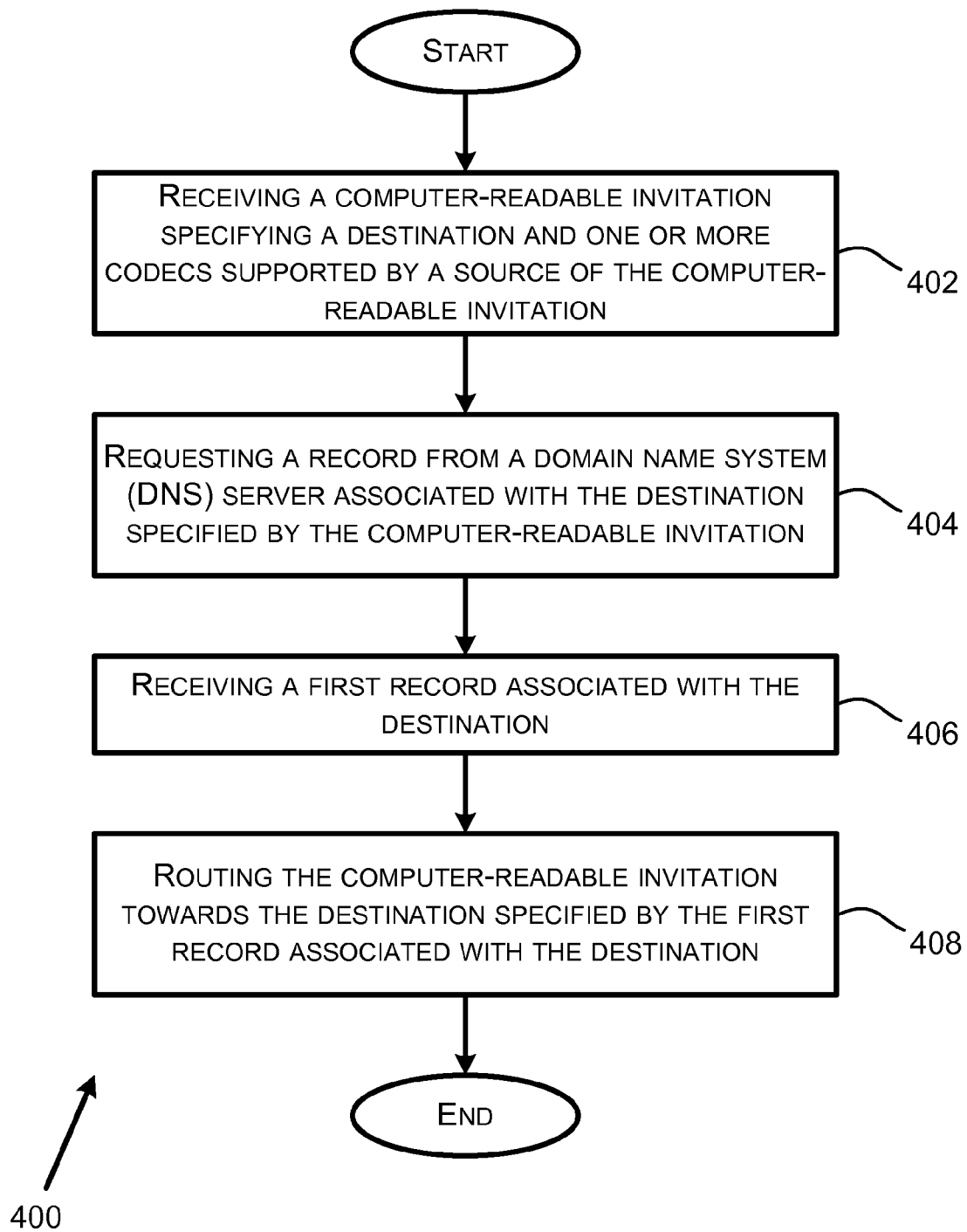
FIG. 4 is a flowchart depicting a set of functions that can be carried out in accordance with one or more example embodiments described herein.

FIG. 4 depicts a flowchart showing a set of functions (for example, operations) 400 (or more simply, "the set 400") that can be carried out in accordance with one or more of the example embodiments described herein. The functions of the set 400 are shown within blocks labeled with even integers between 402 and 408, inclusive. Other functions described herein can be performed prior to, while, or after performing any one or more of the functions of the set 400. Those other functions can be performed in combination with or separately from any one or more of the functions of the set 400.

Block 402 includes receiving a computer-readable invitation (or more simply, an "invitation") specifying a destination and one or more codecs supported by a source of the computer-readable invitation. A gateway, such as gateway 102 or 104 can be the source of the invitation. Alternatively, a user agent device, such as user agent device 108, can be the source of the invitation. The source of the invitation can transmit the invitation to a communication link for transmission to a proxy server, such as proxy server 106. Proxy server 106 can receive the invitation. One or more proxy servers can forward the computer-readable invitation to another proxy server prior to proxy server 106 receiving the computer-readable invitation.

The invitation received at block 402 can comprise a SIP message. The received invitation can be parsed to obtain data specifying the destination and data specifying the one or codecs supported by the source. The one or more codecs can comprise a voice code, a video codec, another codec described in this description, or another codec.

In accordance with one or more example embodiments, the invitation specifies two or more codecs and includes data indicating a preference or ranking of the specified codecs. The preference or ranking can be implicit. The implicit preference or ranking can be based on an order in which the invitation specifies the codecs. The preference or ranking can be explicit using additional data.

The codecs could have a common or equivalent preference or ranking. In that case, proxy server 106 can refer to a data indicating a preference or rankings of codecs for the destination. Alternatively, the invitation can include data indicating at least one most-preferred codec and at least one least-preferred codec. That invitation can include one or more codecs ranked between the most-preferred codec(s) and the least-preferred codec(s).

Next, block 404 includes requesting a record from a domain name system (DNS) server associated with the destination specified by the computer-readable invitation. Requesting the record from the DNS server, such as DNS server 114, can include proxy server 106 or network interface 204 requesting (for example, transmitting a request for) the record from DNS server 114 using record-request 306.

Next, block 406 includes receiving a first record associated with the destination. Receiving the first record can include proxy server 106 or network interface 204 receiving the first record. The first record can be among a plurality of records received by proxy server 106 or network interface 204. Receiving the first record can include receiving record request response 308. Each record of the plurality of records, including the first record, can specify a respective destination gateway associated with the destination specified in the computer-readable invitation.

As an example, the first record can be configured as or include a NAPTR record having a plurality of fields including, but not limited to, a service name field with at least first sub-field. The first sub-field can include characters indicating the first record associated with the destination pertains to a codec. The service name field can include a second sub-field that indicates a resolution service for E.164 to uniform resource indicator (URI). For instance the second sub-field can be referred to as "E2U."

A NAPTR record in accordance with one or more example embodiments can include a regular-expression (regexp) field that specifies a first destination gateway and a codec supported by the first destination gateway. In accordance with the message flow shown in FIG. 3, the first destination gateway can be gateway 104. The NAPTR record can specify an IP address and port associated with the first destination gateway.

Proxy server 106 can select the first destination gateway from among the plurality of destination gateways specified by the plurality of records. Selecting the first destination gateway can be conditioned on the first destination gateway supporting a most-preferred codec among a plurality of codecs supported by the source of the computer-readable invitation and being identified among the plurality of records.

Proxy server 106 can request a service record associated with the first destination gateway selected by proxy server 106. In response to requesting the service record, proxy server 106 can receive a service record specifying an IP address and port associated with the first destination gateway.

Next, block 408 includes routing the computer-readable invitation towards the destination specified by the first record associated with the destination. Routing the invitation can include proxy server 106 executing CRPI 210 to cause network interface 204 to transmit the invitation to link 124 towards gateway 104. The invitation routed towards the destination can comprise a SIP INVITE message. The invitation can include data indicating the source of the invitation, the destination of the invitation, or an IP address and port associated with a gateway the destination communicates with to carry out communication sessions. Routing the invitation can include routing the invitation to the IP address and port associated with the gateway.

After routing the computer-readable invitation towards the destination, the destination or a gateway the destination uses to carry out a communication session can receive the invitation and cause a communication session to be established between the source and the destination. At least one of the source and destination can use a gateway to communicate voice or other data during the communication session.

V. Conclusion

Example embodiments have been described above. Those skilled in the art will understand that changes and modifications can be made to the described embodiments without departing from the true scope and spirit of the present invention, which is defined by the claims.

We claim:

1. A method comprising:
    receiving, by a proxy server, a computer-readable invitation specifying a destination and multiple codecs supported by a source of the computer-readable invitation;
    requesting, by the proxy server and from a domain name system (DNS) server, a record associated with the destination specified by the computer-readable invitation;
    receiving, by the proxy server in response to requesting the record, multiple records identifying a respective gateway to the destination specified by the computer-readable invitation;
    selecting, by the proxy server and from among the gateways identified by the multiple records, a first gateway to the destination identified by a first record of the multiple records, wherein selecting the first gateway is conditioned on the first gateway supporting a most-preferred codec among the multiple codecs supported by the source of the computer-readable invitation and being identified among the multiple records; and
    routing, by the proxy server, the computer-readable invitation towards the first gateway to the destination.

2. The method of claim 1, wherein the computer-readable invitation received by the proxy server comprises a session initiation protocol (SIP) INVITE.

3. The method of claim 2, wherein the source of the computer-readable invitation comprises a SIP-PSTN gateway.

4. The method of claim 2, wherein the source of the computer-readable invitation comprises a user-agent device.

5. The method of claim 1, wherein the most-preferred codec is a voice codec or a video codec.

6. The method of claim 1, wherein the computer-readable invitation specifies a ranking of the multiple codecs from a greatest ranked codec to a lowest-ranked codec.

7. The method of claim 6,
    wherein none of the gateways identified by the multiple records supports the greatest ranked codec, and
    wherein the most-preferred codec comprises a next greatest ranked codec among the multiple ranked codecs.

8. The method of claim 6, wherein two or more of the multiple codecs have a common ranking.

9. The method of claim 1,
    wherein the first record comprises a naming authority pointer (NAPTR) record having a service name field with at least a first sub-field, and
    wherein the first sub-field includes characters indicating the first record pertains to a codec.

10. The method of claim 9, wherein the service name field includes a second sub-field indicating a resolution service for E.164 to uniform resource indicator (URI).

11. The method of claim 9, wherein the NAPTR record includes a regular-expression field specifying the first gateway and a codec supported by the first gateway.

12. The method of claim 11,
    wherein the NAPTR record specifies an internet protocol address and port associated with the first gateway, and
    wherein routing the computer-readable invitation towards the first gateway comprises routing the computer-readable invitation to the internet protocol address and port associated with the first gateway specified by the NAPTR record.

13. The method of claim 11, further comprising:
    requesting, by the proxy server, a service record associated with the first gateway; and receiving, by the proxy server in response to requesting the service record associated with first gateway, a service record specifying an internet protocol address and port associated with the first gateway, wherein routing the computer-readable invitation towards the gateway to the destination comprises routing the computer-readable invitation to the internet protocol address and port associated with the first gateway specified by the service record.

14. The method of claim 1, wherein the destination associated with the first record comprises (i) a session initiation protocol phone connected to the Internet, or (ii) a gateway connected to the Internet and connected to a public switched telephone network including a telephone associated with the destination.

15. The method of claim 1, further comprising:

after routing the computer-readable invitation towards the first gateway to the destination, at least one of the destination and the first gateway receives the invitation and causes a communication session to be established between the source and the destination.

16. A system comprising:

a network interface configured to receive a computer-readable invitation specifying a destination and multiple codecs supported by a source of the computer-readable invitation;

a processor; and a non-transitory data storage device storing computer-readable program instructions, wherein the program instructions are executable by the processor to:

cause the network interface to request, from a domain name system (DNS) server, a record associated with the destination specified by the computer-readable invitation, receive multiple records identifying a respective gateway to the destination specified by the computer-readable invitation, select, from among the gateways identified by the multiple records, a first gateway to the destination identified by a first record of the multiple records, wherein selecting the first gateway is conditioned on the first gateway supporting a most-preferred codec among the multiple codecs supported by the source of the computer-readable invitation and being identified among the multiple records; and cause the network interface to route the computer-readable invitation towards the first gateway to the destination.

17. The system of claim 16, wherein the computer-readable invitation received by the network interface comprises a computer-readable invitation transmitted to a network link connected to the network interface from a proxy server, a gateway, or a user agent device.

18. The system of claim 16, wherein the computer-readable invitation comprises a session initiation protocol (SIP) INVITE.

19. A non-transitory computer-readable data storage device comprising program instructions executable by a processor to cause performance of the following operations:

receiving a computer-readable invitation specifying a destination and multiple codecs supported by a source of the computer-readable invitation;

requesting, from a domain name system (DNS) server, a record associated with the destination specified by the computer-readable invitation;

receiving, in response to requesting the record, multiple records identifying a respective gateway to the destination specified by the computer-readable invitation;

selecting, from among the gateways identified by the multiple records, a first gateway to the destination identified by a first record of the multiple records, wherein selecting the first gateway is conditioned on the first gateway supporting a most-preferred codec among the multiple codecs supported by the source of the computer-readable invitation and being identified among the multiple records; and routing the computer-readable invitation towards the first gateway to the destination.

20. The computer-readable data storage device of claim 19, wherein the first record comprises a naming authority pointer (NAPTR) record having a service name field with at least a first sub-field, wherein the first sub-field includes characters indicating the first record pertains to a codec, and wherein the NAPTR record includes a regular-expression field specifying the first gateway and a codec supported by the first gateway.

\* \* \* \* \*